US012810139B2

(12) United States Patent
Lukens et al.

(10) Patent No.: US 12,810,139 B2
(45) Date of Patent: Nov. 24, 2026

(54) SEASONAL COMPONENT ADJUSTMENT IN NETWORK ANOMALY DETECTION

(71) Applicant: T-Mobile Innovations LLC, Overland Park, KS (US)

(72) Inventors: Lance Paul Lukens, Templeton, CA (US); Hui-Lin Chang, Brambleton, VA (US); Shawn Derek Wallace, Charles Town, WV (US); Piradee Nganrungruang, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 1216 days.

(21) Appl. No.: 17/646,231

(22) Filed: Dec. 28, 2021

(65) Prior Publication Data

US 2023/0206060 A1 Jun. 29, 2023

(51) Int. Cl.
*G06N 3/08* (2023.01)
*G06F 17/18* (2006.01)
(Continued)

(52) U.S. Cl.
CPC ............... *G06N 3/08* (2013.01); *G06F 17/18* (2013.01); *G06N 3/042* (2023.01); *G06N 3/044* (2023.01); *H04L 43/16* (2013.01); *H04L 43/062* (2013.01)

(58) Field of Classification Search
CPC .......... G06N 3/08; G06N 3/042; G06N 3/044; G06F 17/18; H04L 43/00; H04L 43/16; H04L 43/062
See application file for complete search history.

(56) References Cited

U.S. PATENT DOCUMENTS 11,294,756 B1 * 4/2022 Sadrieh .................. G06N 3/047
2017/0279694 A1 9/2017 Sartran et al.
(Continued)

FOREIGN PATENT DOCUMENTS

CA 2549577 A1 * 3/2006
WO WO-2020159439 A1 * 8/2020

OTHER PUBLICATIONS

Anomaly Detection in Univariate Time-Series: Asurvey on the State-of-the-Art by Mohammad Braei, Sebastian Wagner (Year: 2020).*

(Continued)

*Primary Examiner* — Kamran Afshar
(74) *Attorney, Agent, or Firm* — Shook, Hardy & Bacon L.L.P.

(57) ABSTRACT

Anomalies are detected in network traffic exhibiting a seasonal variation. A neural network is trained using historical network traffic metrics, and as a result, the trained neural network is configured to output a mean error from a network traffic metric input. A decision tree model is trained on a training dataset comprising historical network traffic metric outputs at associated times. To identify an anomaly, network traffic metrics for a particular time are provided as an input to the trained neural network that, in response, outputs the mean error. The particular time is input into the trained decision tree model to output a mean error adjustment. The mean error is adjusted using the mean error adjustment, and the resulting adjusted mean error is compared to a static mean error threshold value to identify the anomaly.

20 Claims, 7 Drawing Sheets

(51) Int. Cl.

| | |
|---|---|
| ***G06N 3/042*** | (2023.01) |
| ***G06N 3/044*** | (2023.01) |
| ***H04L 43/16*** | (2022.01) |
| *H04L 43/062* | (2022.01) |

(56) References Cited

U.S. PATENT DOCUMENTS

| | | | |
|---|---|---|---|
| 2018/0234302 | A1 | 8/2018 | James et al. |
| 2019/0068457 | A1 * | 2/2019 | Sharma ............... H04L 43/0817 |
| 2020/0177485 | A1 * | 6/2020 | Shurtleff ............... H04L 63/101 |
| 2020/0285997 | A1 * | 9/2020 | Bhattacharyya ......... G06N 7/01 |
| 2021/0158260 | A1 | 5/2021 | Kolar et al. |
| 2021/0160257 | A1 | 5/2021 | Elyashiv et al. |
| 2021/0304061 | A1 | 9/2021 | Kolar et al. |
| 2022/0053010 | A1 | 2/2022 | Elyashiv et al. |
| 2022/0366316 | A1 | 11/2022 | Sharma et al. |

OTHER PUBLICATIONS

Machine Learning Models for Predictive Maintenance and Performance Optimization in Telecom Infrastructure by Venkata Bhardwaj Komaragiri. (Year: 2021).*

Notice of Allowance dated Aug. 21, 2023 in U.S. Appl. No. 17/646,215, 8 pages.

Olah, Christopher, "Understanding LSTM Networks,"Colah's Blog, Aug. 2015, <http://colah.github.io/posts/2015-08-Understanding-LSTMs/>, 9 pages.

Thakur, Nitish Kumar, "Anomaly Detection in Python—Part 2; Multivariate Unsupervised Methods and Code,"Towards Data Science,<https://towardsdatascience.com/anomaly-detection-in-python-part-2-multivariate-unsupervised-methods-and-code-b311a63f298b>, May 2021, 17 pages.

Final Office Action dated Jun. 14, 2023 in U.S. Appl. No. 17/646,215, 20 pages.

Non-Final Office Action dated Dec. 22, 2022 in U.S. Appl. No. 17/646,215, 15 pages.

Larzalere, Brent, "LSTM Autoencoder for Anomaly Detection," Towards Data Science, Sep. 2019, <https://towardsdatascience.com/lstm-autoencoder-for-anomaly-detection-e1f4f2ee7ccf>, 13 pages.

"Statsmodels v0.13.2," Statsmodels.org, <https://www.statsmodels.org/stable/generated/statsmodels.tsa.seasonal.seasonal_decompose.html>, 3 pages.

"MPLS WAN," NexGen Networks, <https://www.nexgen-net.com/services/mpls-wan.html>, 2 pages.

* cited by examiner

SEASONAL COMPONENT ADJUSTMENT IN NETWORK ANOMALY DETECTION

CROSS-REFERENCE TO RELATED APPLICATIONS

This application relates to U.S. application Ser. No. 17/646,215, entitled "Network Anomaly Detection Using Machine Learning," filed on Dec. 28, 2021, and issued as U.S. U.S. Pat. No. 11,848,843 on Dec. 19, 2023, which is hereby expressly incorporated by reference in its entirety.

TECHNICAL FIELD

The technology relates to anomaly detection in network traffic.

SUMMARY

At a high level, aspects described herein relate to machine learning for anomaly detection in network traffic of a network, such as a telecommunications network. In particular, anomalies in the network traffic can be detected using multiple machine learning models. In a specific example, a neural network is trained to output a mean error for the network traffic. This can be done by training an autoencoder on network traffic metrics, such as network throughput, such that the trained neural network outputs the mean error as a reconstruction error.

To determine whether there is an anomaly, the output mean error of the neural network is adjusted and then compared to a threshold value. A mean error adjustment can be determined using a trained decision tree model, which has been trained on a time series of historical mean error outputs, such as, for instance, the past mean error outputs by the trained neural network for specific times. The mean error is adjusted using the mean error adjustment to determine an adjusted mean error. The adjusted mean error can then be compared to the threshold value for anomaly detection.

The adjusted mean error accounts for the seasonal variation that can occur in network traffic. This provides a higher degree of accuracy compared to using only a static threshold value for anomaly detection.

This summary is intended to introduce a selection of concepts in a simplified form that are further described below in the detailed description section of this disclosure. This summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1:
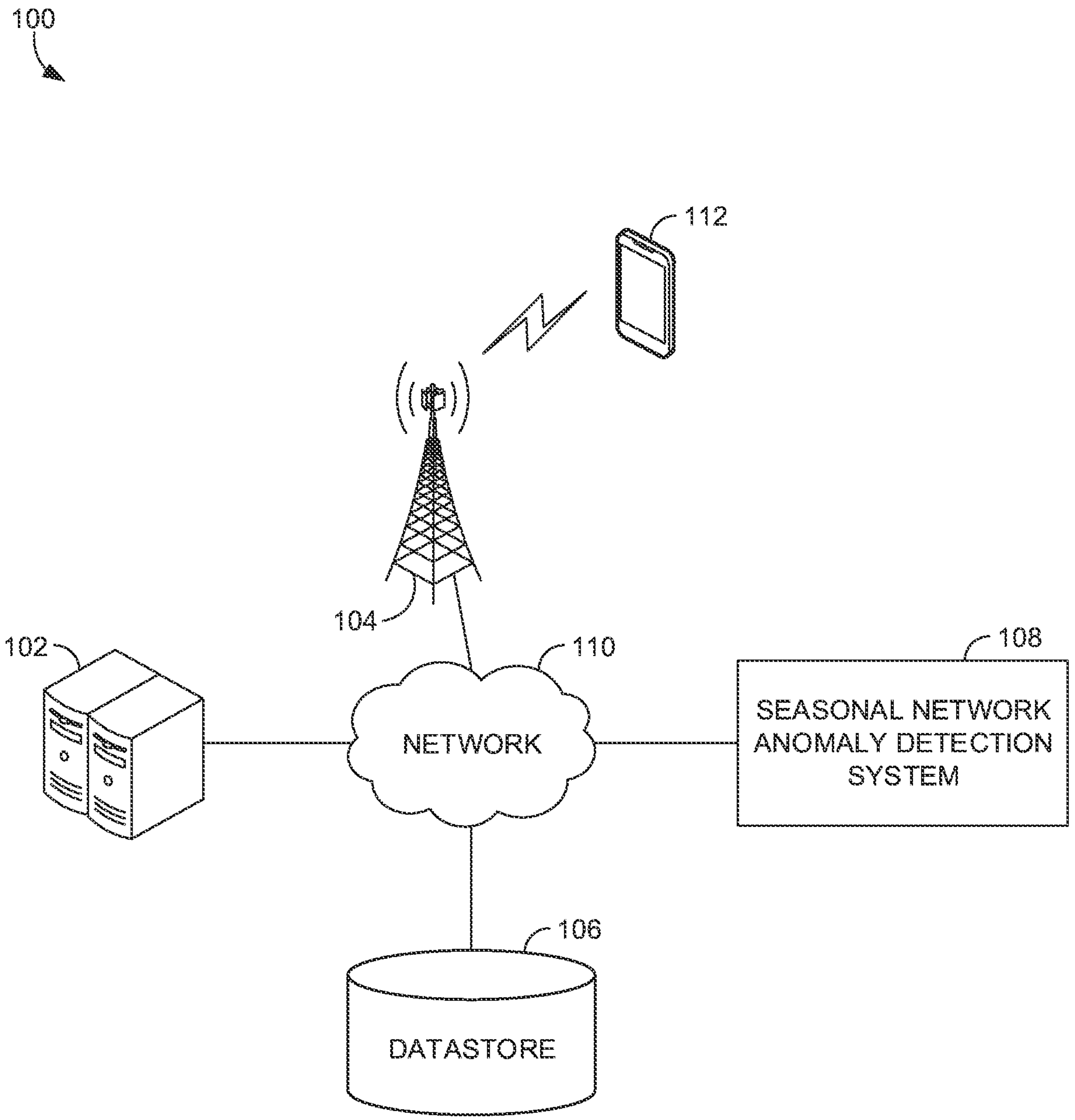
FIG. 1 is an example operating environment in which a seasonal network anomaly detection system is employed, in accordance with an embodiment described herein.

Throughout this disclosure, several acronyms and shorthand notations are used to aid in the understanding of certain concepts. These acronyms and shorthand notations are intended to help provide an easy methodology of communicating the ideas expressed herein, and are not meant to limit the scope of the present disclosure and technology. The following is a list of the acronyms:

CD-ROM Compact Disk Read Only Memory
CDMA Code Division Multiple Access
eNodeB Evolved Node B
gNodeB Next Generation Node B
GPRS General Packet Radio Service
GSM Global System for Mobile communications
DVD Digital Versatile Discs
EEPROM Electrically Erasable Programmable Read Only Memory
LTE Long Term Evolution
LSTM Long Short-Term Memory
MPLS Multiprotocol Label Switching
PC Personal Computer
PDA Personal Digital Assistant
RAM Random Access Memory
RF Radio-Frequency
RNN Recurrent Neural Network
ROM Read Only Memory
TDMA Time Division Multiple Access
UE User Equipment Further, various technical terms are used throughout this description. An illustrative resource that describes these terms may be found in Newton's Telecom Dictionary, 27th Edition (2012).

As noted, the present disclosure relates to using machine learning for anomaly detection in a network. As used in this disclosure, a "network" generally refers to a system of communicatively coupled hardware devices. Communications across the network from one device to another are collectively referred to as "network traffic." A network can include a telecommunications network facilitating telecommunications network traffic.

Anomalies in the network traffic can sometimes indicate a degradation in the performance of devices communicating across the network. As such, it is beneficial to identify anomalies so that remediation action can be taken to correct the issue at the source of the anomaly in an effort to increase performance of the devices.

As will be described, methods of machine learning can be employed to identify anomalies. In particular, methods of using multiple trained machine learning models can be used to better identify anomalies compared to conventional methods.

One such example uses a trained neural network and a trained decision tree model. A neural network can be trained on network traffic metrics. The network traffic metrics can be determined from the network traffic and include metrics such as throughput, bandwidth, latency, and peak gateway performance, among others. The trained neural network can then be employed to predict network metrics for network traffic. This can include determining a mean error between the network traffic metrics and the predicted network traffic metrics using the trained neural network. An autoencoder, such as an LSTM autoencoder, can be used to determine a mean error. The mean error may include a mean absolute error (MAE), root mean squared error (RMSE), mean absolute percentage error (MAPE), mean squared error (MSE) or any other error quantification measure.

The mean error can be adjusted using a mean error adjustment determined by another machine learning model, such as a trained decision tree model. Trained decision tree models can include machine learning models based on Isolation Forest, LightGBM, and XGBoost, among others. A decision tree model can be trained to generate the trained decision tree model using a time series of historical mean error outputs from the neural network. In this way, the trained decision tree model outputs a mean error adjustment based on an input of a particular time.

The mean error determined by the trained neural network can then be adjusted using the mean error adjustment of the trained decision tree model to provide an adjusted mean error. An anomaly can then be identified based on the adjusted mean error. In one such anomaly identification method, the adjusted mean error is compared to a static threshold, and an anomaly is identified if the adjusted mean error exceeds the static threshold.

The methods provided by this disclosure depart from conventional methods that employ only a static threshold. Such methods fail to account for seasonal variations in a time sequence of data, such as the network traffic metrics, and thus may not identify many anomalies that degrade the performance of devices communicating across the network.

By using a second machine learning model to determine the mean error adjustment, anomalies can be more accurately detected in a network exhibiting a seasonal variation in the network traffic metrics during a time period. While useful in many contexts, this is particularly beneficial when there are hour-by-hour fluctuations in network traffic, such as those experienced during a 24-hour time period, during which there is generally less network traffic during late-night hours versus peak usage times of the day.

It will be realized that the method previously described is only an example that can be practiced from the description that follows, and it is provided to more easily understand the technology and recognize its benefits. Additional examples are now described with reference to the figures.

With reference now to FIG. 1, FIG. 1 illustrates example operating environment 100 in which aspects of the technology can be employed. Operating environment 100 comprises server 102, cell site 104 of a wireless communications network, datastore 106, and seasonal network anomaly detection system 108, which are each communicating via network 110. FIG. 1 also illustrates mobile device 112 in wireless communication with cell site 104 within the wireless communications network.

Server 102 represents one more servers configured in any arrangement. Server 102 generally employs aspects of seasonal network anomaly detection engine 108, which generally identifies anomalies in network traffic, such as traffic within the wireless communications network. Server 102 may be any computing device. One example computing device suitable for use as server 102 is computing device 700 of FIG. 7.

By way of background, a traditional wireless communication network employs one or more wireless access points to provide wireless access to mobile stations, in order that they may access a telecommunication network. For example, in a wireless telecommunication network, a plurality of access points, each providing service for a particular geographic area, are used to transmit and receive wireless signals to or from one or more devices, such as mobile devices. For the purposes of this specification, an access point may be considered to be one or more otherwise discrete components comprising an antenna, a radio, or a controller, and may be alternatively referred to as a "node," in that it is a bridge between the wired telecommunication network and the wirelessly connected devices.

As used herein, the term "access point" can also be synonymous with the terms "node" or "base station," or another like term. The terms "user device," "user equipment," "UE," "mobile device," "mobile handset," and "mobile transmitting element" all describe a mobile station and may be used interchangeably in this description. A "mobile device" or other like term, as used herein, is a device that has the capability of using a wireless communications network. A mobile device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1XA, GPRS, EvDO, TDMA, GSM, WiMax technology, LTE, or LTE Advanced, and 5G, among other technologies and standards.

Cell site 104 is configured to wirelessly communicate between the one or more mobile devices, such as mobile device 112, and within the wireless communications network. As used herein, the term "cell site" is used generally to refer to one or more cellular base stations, nodes, RRU control components, and the like (configured to provide a wireless interface between a wired network and a wirelessly connected user device), which are geographically concentrated at a particular site so as not to obscure the focus of the present invention. Though illustrated as a macro site, the cell site 202 may be a macro cell, small cell, femto cell, pico cell, or any other suitably sized cell, as desired by a network carrier for communicating within a particular geographic area. In aspects, the cell site 202 may comprise one or more nodes (e.g., NodeB, eNodeB, ng-eNodeB, gNodeB, en-gNodeB, and the like) that are configured to communicate with user devices in one or more discrete geographic areas using one or more antennas of an antenna array.

Datastore 106 generally stores information, including data, computer instructions (e.g., software program instructions, routines, or services), or models used in embodiments of the described technologies. Although depicted as a single database component, datastore 106 may be embodied as one or more data stores or may be in the cloud. In an aspect, datastore 106 stores computer instructions that can be executed by server 102 to perform aspects of seasonal network anomaly detection system 108.

Network 110 may include one or more networks (e.g., public network or virtual private network "VPN") as shown with network 110. Network 110 may include, without limitation, one or more local area networks (LANs), wide area networks (WANs), or any other communication network or method.

Having identified various components of operating environment 100, it is again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of the previously listed components. Other arrangements and elements (e.g., machines, interfaces, functions, orders, and groupings of functions, etc.) can be used in addition to or instead of those shown, and some elements may be omitted altogether.

Figure 2:
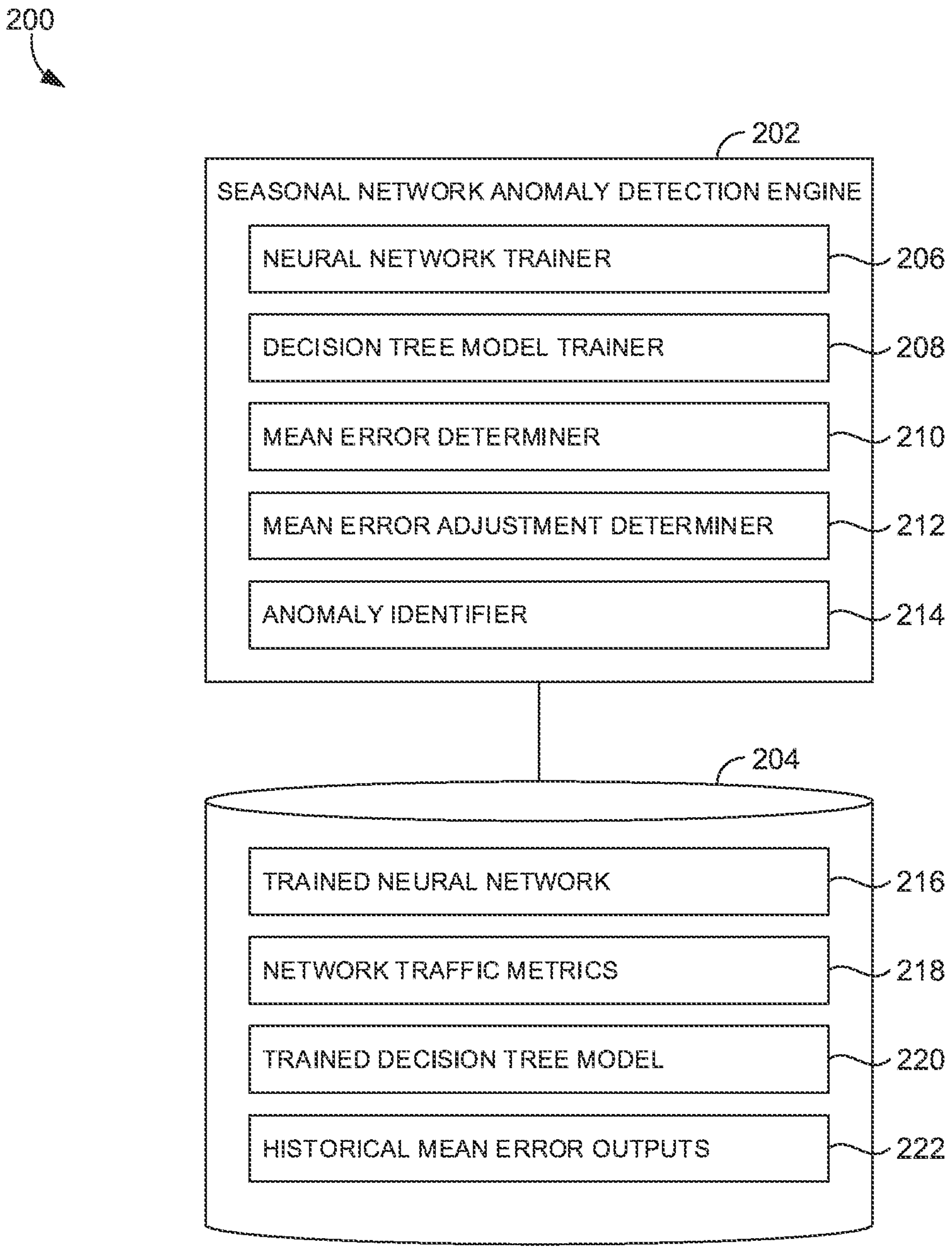
FIG. 2 is a seasonal network anomaly detection system that is an example suitable for use as the seasonal network anomaly detection system of FIG. 1, in accordance with an embodiment described herein.

Turning now to FIG. 2, FIG. 2 is one example seasonal network anomaly detection system 200 that is suitable for use as seasonal anomaly detection system 108, illustrated in FIG. 1. In general, seasonal network anomaly detection system 200 identifies anomalies in network traffic, including network traffic that exhibits seasonal patterns.

As illustrated, seasonal network anomaly detection system 200 comprises seasonal network anomaly detection engine 202. Seasonal network anomaly detection engine 202 is one example that can be used to identify network anomalies by adjusting for the seasonal variation in the network traffic. The example seasonal network anomaly detection engine 202 illustrated in FIG. 2 comprises neural network trainer 206, decision tree model trainer 208, mean error determiner 210, mean error adjustment determiner 212, and anomaly identifier 214.

Many of the elements described in relation to FIG. 2, such as those described in relation to seasonal network anomaly detection engine 202, are functional entities that may be implemented as discrete or distributed components or in conjunction with other components of FIG. 1, and in any suitable combination and location. Various functions described herein are being performed by one or more entities and may be carried out by hardware, firmware, or software. For instance, various functions may be carried out by a processor executing computer-executable instructions stored in memory. Moreover, the functions described in relation to FIG. 2 may be performed by server 102 at either a front-end, client-side or a back-end, server-side, or any combination.

FIG. 2 also illustrates datastore 204. One example suitable for use as datastore 204 is memory 704 of FIG. 7. Datastore 204 is one example that may be used as datastore 106 of FIG. 1.

As part of detecting anomalies, seasonal network anomaly detection engine 202 employs neural network trainer 206. In general, neural network trainer 206 trains a neural network to generate a trained neural network. The trained neural network can be stored in datastore 204, such trained neural network 216. Trained neural network 216 may be employed as one of a plurality of machine learning models to identify anomalies in network traffic.

One neural network that can be trained by neural network trainer 206 and that is suitable for use in identifying anomalies in network traffic includes an RNN, and other like neural networks. An LSTM neural network, or another like model, is one type of RNN that can be used with the present technology. Autoencoders may also be used. One particular example of a neural network trained by network trainer 206 and employed by components of seasonal network anomaly detection engine 202 is an LSTM autoencoder.

Neural network trainer 206 can train a neural network using network traffic metrics 218 measured from network traffic over a period of time, which may also be referred to as historical network traffic metrics. Network traffic metrics can comprise any quantifiable aspect of network traffic across a network. This can include values such as throughput, bandwidth, number of user devices, and so on. Neural network trainer 206 can employ unsupervised training to train the neural network. In one method of doing so, the neural network, such as an autoencoder, encodes a time series of network traffic metrics into a lower dimension and then decodes the lower dimensional representation of encoded network traffic metrics. In doing so, the mean error is minimized, and the autoencoder learns the optimal weights for mean error minimization. The trained autoencoder can be stored as trained neural network 216 for use by other components of seasonal network anomaly detection engine 202.

The time series of network traffic metrics can comprise any period of time. However, one period of time that has been found to yield good results is a one-year period for the time series of network traffic metrics. To keep up with trends in network traffic usage, neural network trainer 206 can be configured to train the neural network periodically. One time period that is sufficient for retraining is one week. Thus, in an embodiment, neural network trainer 206 trains a neural network periodically, where the period for training is each one week or less. In another embodiment, the training period can be one month or less. Neural network trainer 206 can train the neural network on a time series of network traffic metrics 218, where the time period is one year or less. In another embodiment, the time period is two years or less.

Decision tree model trainer 208 generally trains a decision tree model to generate a trained decision tree model, such as trained decision tree model 220 in datastore 204. Decision tree model trainer 208 may train any type of decision tree model or other like model for use by seasonal network anomaly detection engine 202. For example, the technology can employ decision tree models based on XGBoost, Isolation Forest, LightGBM, and other like models. The decision tree model may comprise a decision tree model employing classification or regression.

Decision tree model trainer 208 can employ supervised training techniques to train the decision tree model. Decision tree model trainer 208 trains the decision tree model using the mean error output of trained neural network 216. The outputs over time of trained neural network 216 can be stored as historical mean error outputs 222. Each of the mean error outputs within historical mean error outputs 222 is associated with a particular time. That is, when trained neural network 216 outputs a mean error, the mean error output is recorded and the time at which the mean error was recorded is indexed as part of historical mean error outputs 222. The mean error outputs and their associated times can be used as a labeled dataset, e.g., the historical mean error outputs 222, for training the decision tree model.

In some instances, the mean error outputs exhibit a seasonal variation. This is because the neural network is trained using a time period of data greater than the time period of the seasonable fluctuation. Thus, over shorter time periods, such as a 24-hour time period, the mean error output may exhibit an hour-by-hour pattern of increase and decrease. If only a static threshold value is used, then the static threshold is generally set high enough to avoid false indications of anomalies during normal increases in the mean error output at particular times during the day. However, during times at which the mean error output is experiencing a normal decrease, then an anomaly must more greatly affect the mean error to be classified as an anomaly relative to an anomaly at a time where there is a normal increase in the mean error. This problem is alleviated using the decision tree model to adjust the mean error output to effectively account for the seasonal variation and allow for better anomaly detection at times of normal decrease in mean error outputs.

To more accurately identify anomalies in network traffic exhibiting a seasonal variation, seasonal network anomaly detection engine 202 employs mean error determiner 210 to determine a mean error, employs mean error adjustment determiner 212 to determine an adjustment for the mean error, and employs anomaly identifier 214 to identify anomalies using the adjusted mean error.

Mean error determiner 210 generally determines a mean error. To do so, mean error determiner can employ trained neural network 216. As noted, in some cases trained neural network 216 can be an autoencoder, such as an LSTM autoencoder. This is one example classification of models that can output a mean error determined from the difference between the recreation error of the input and the expected recreation value predicted based on the training.

In an example, mean error determiner 210 determines the mean error by inputting network traffic metrics measured from the network into trained neural network 216. As such, the mean error can be determined using trained neural network 216 in response to trained neural network 216 receiving the network traffic metrics as an input.

In this case, the output of trained neural network 216 is the mean error. The mean error may be determined for a particular time. That is, the network traffic metrics measured from the network may be measured at a particular time. Thus, the output mean error from trained neural network 216 is associated with the particular time at which the network traffic metrics were measured. Network traffic metrics can be measured at a present time or recalled at any time from network traffic metrics 218.

Seasonal network anomaly detection engine 202 can employ mean error adjustment determiner 212 to determine a mean error adjustment for adjusting the mean error determined by mean error determiner 210. To determine the mean error adjustment, mean error adjustment determiner 212 can employ trained decision tree model 220.

Mean error adjustment determiner 212 provides a particular time as an input into trained decision tree model 220. In response, trained decision tree model 220 outputs a mean error adjustment.

Anomaly identifier 214 may be used to identify an anomaly in the network traffic. In general, anomaly identifier 214 identifies the anomaly in the network traffic based at least on the mean error adjustment determined by mean error adjustment determiner 212. To identify an anomaly, anomaly identifier 214 can compare the mean error determined using mean error determiner 210 to the mean error adjustment determined by mean error adjustment determiner 212.

In one example method, anomaly identifier 214 determines an adjusted mean error and identifies the anomaly from the adjusted mean error. For instance, the adjusted mean error can be determined based on the mean error adjustment. For example, the adjusted mean error can be determined based on the difference between the mean error and the mean error adjustment. Here, the mean error adjustment can be subtracted from the mean error to determine the adjusted mean error.

The adjusted mean error can then be compared to a static mean error threshold value to determine whether there is an anomaly. For instance, if the adjusted mean error exceeds the static mean error threshold value, then anomaly identifier 214 identifies the network traffic metrics input into trained neural network 216 for the particular time as a network anomaly. In some cases, the adjusted mean error is compared to the static mean error threshold value, and an anomaly is determined based on a number of standard deviations between the adjusted mean error and the static mean error threshold value.

In general, the static mean error threshold value can be set at any value based on the sensitivity at which seasonal network anomaly detection engine 202 identifies an anomaly. In some cases, the static mean error threshold value is determined based on training the neural network. For instance, the static mean error threshold value can be greater than the expected mean error determined from the training. The static mean error threshold value can be determined experimentally and can be based on a number of false positive anomalies relative to a number of true anomalies identified.

In an embodiment, static mean error threshold value is adjusted by the mean error adjustment output determined by the trained decision tree model, and an anomaly is identified when the mean error, output by the trained neural network, exceeds an adjusted mean error threshold value.

Figure 3A:
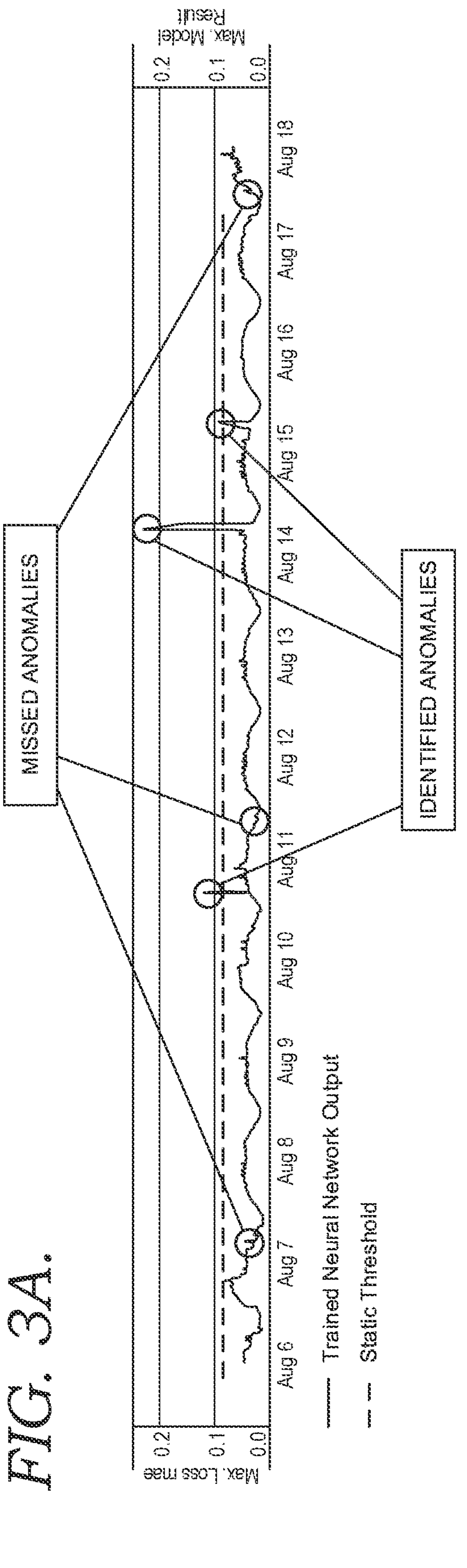
FIG. 3A is a graph illustrating anomaly detection using a static threshold value without adjusting for seasonal variations, in accordance with an embodiment described herein.

FIG. 3A illustrates an example embodiment of anomaly detection reduced to practice, where a static threshold value is used without an adjusted mean error. As illustrated, an output of a trained neural network, such as trained neural network 216, is shown as a solid line. The output is exhibiting seasonal variation. Due to this, there are anomalies in the network traffic that go undetected, since at lower mean error values, there is a greater difference between the output and the static threshold.

Figure 3B:
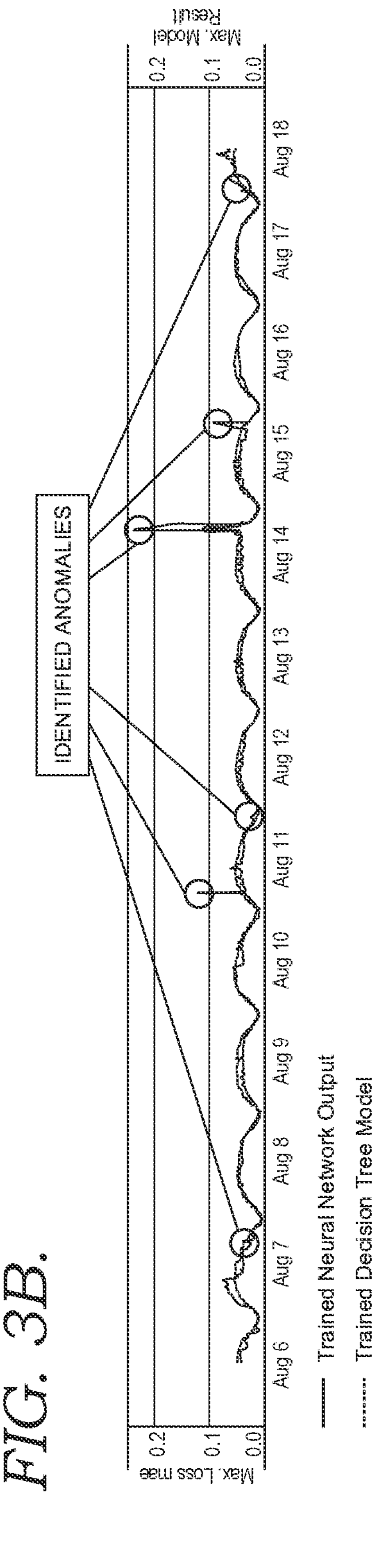
FIG. 3B is a graph illustrating anomaly detection by adjusting for the seasonal variation using the seasonal network anomaly detection system of FIG. 2, in accordance with an embodiment described herein.

FIG. 3B illustrates an example embodiment reduced to practice in which the seasonal variation has been adjusted for. In this case, seasonal network anomaly detection engine 202 can be used to provide the result illustrated in FIG. 3B. In this example, the output of the trained neural network, such as trained neural network 216, is represented as a solid line, while the output of a trained decision tree model, such as trained decision tree model 220, is illustrated as a broken line.

In the example illustrated in FIG. 3B, an anomaly can be determined based on the output of the trained decision tree model. That is, the output can be determined based on the adjustment determined by the trained decision tree model. In some cases, the mean error output determined by the trained neural network model is compared to the output of the trained decision tree model. If the mean error output of the trained neural network model exceeds the output of the trained decision tree model, an anomaly is identified. In some cases, the mean error output of the trained neural network is adjusted using the output of the trained decision tree model, and the adjusted mean error output is identified as anomalous when it exceeds a static threshold value.

Figure 4:
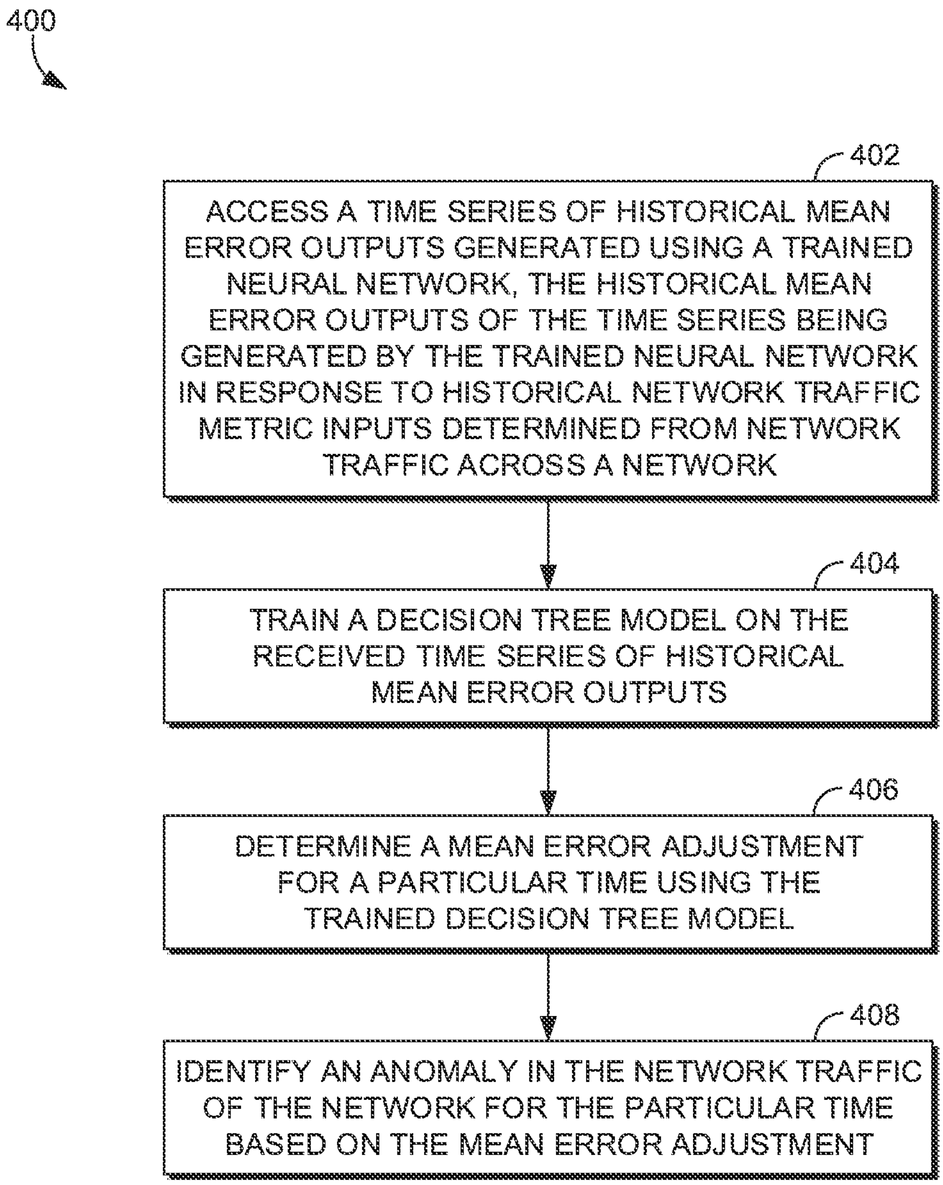
FIGS. 4-6 are flow diagrams of example methods of anomaly detection that can be performed using the seasonal network anomaly detection system of FIG. 2, in accordance with embodiments described herein.
Figure 5:
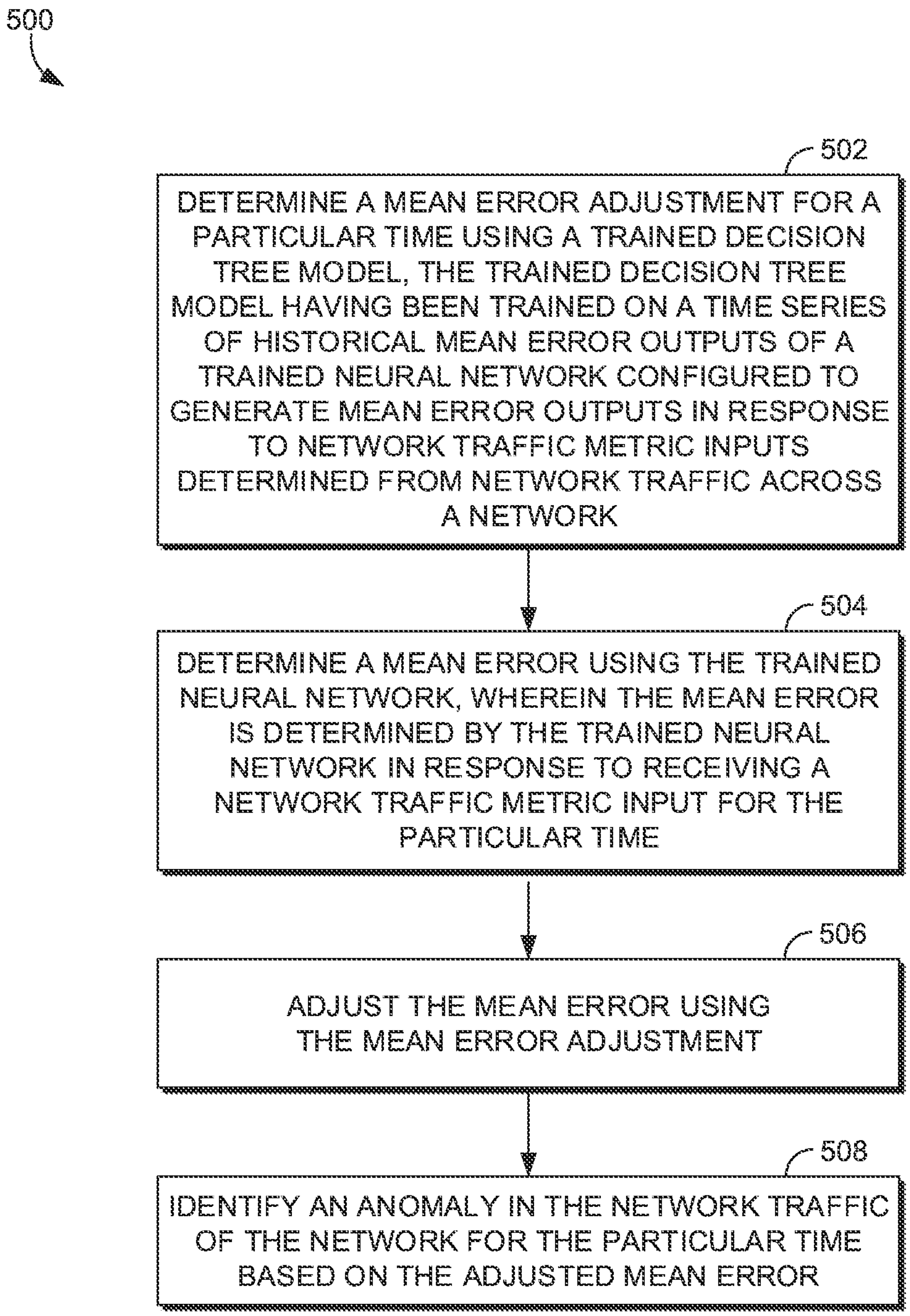
Figure 6:
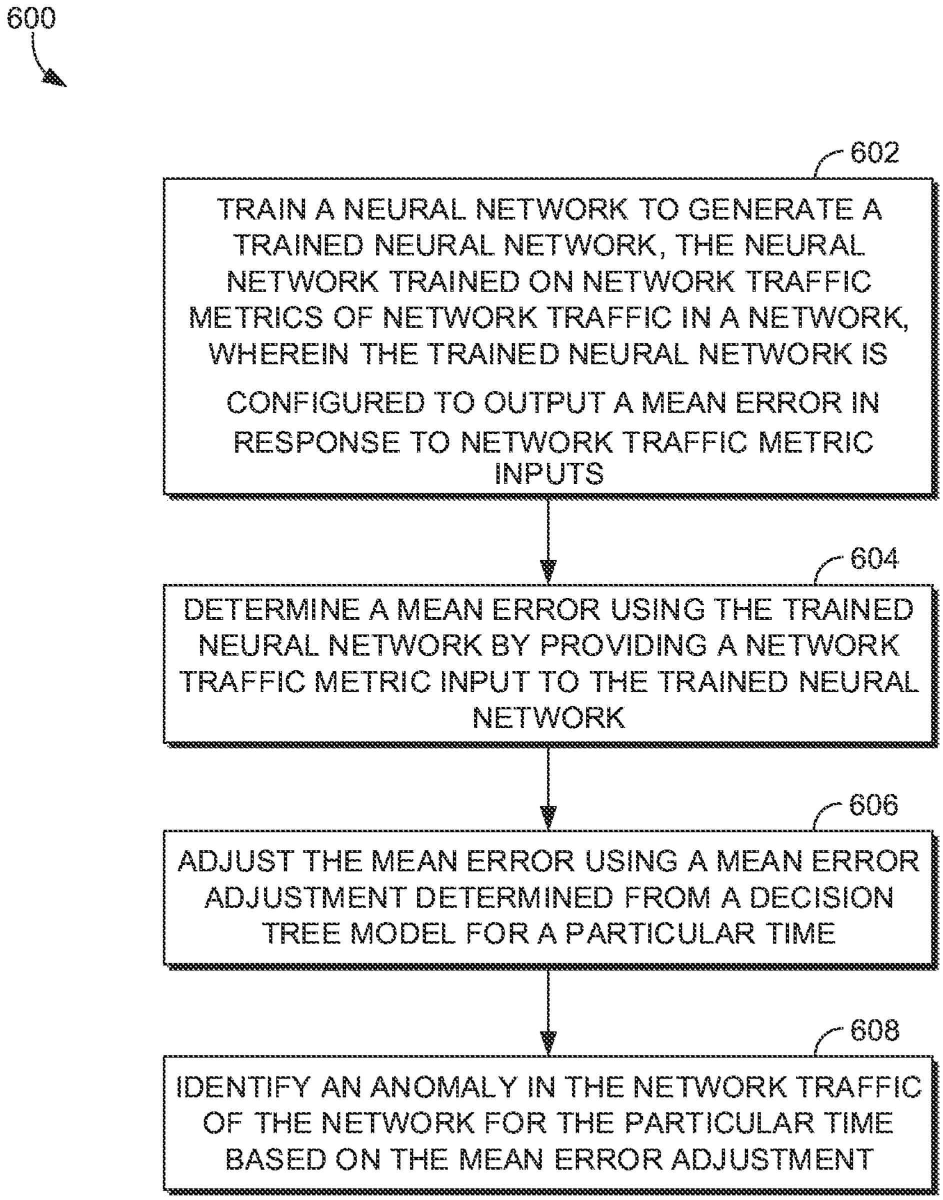

With reference now to FIGS. 4, 5, and 6, flow diagrams are provided that respectively illustrate methods 400, 500, and 600 for anomaly detection. Each block of methods 400, 500, and 600 comprises a computing process performed using any combination of hardware, firmware, or software.

For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. Methods 400, 500, and 600 may be implemented by seasonal network anomaly detection system 200 of FIG. 2.

FIG. 4 illustrates an example method 400 of anomaly detection. At block 402, a time series of historical mean error outputs is accessed, such as a series of historical mean error outputs 222. The time series of historical mean error outputs may be generated by a trained neural network, such as trained neural network 216. The trained neural network may be generated by training a neural network on historical network traffic metrics. For example, the training may be performed by neural network trainer 206. The time series can be generated by the trained neural network in response to historical network traffic inputs over a period of time associated with the time series that have been determined from network traffic across a network. In an example, the trained neural network is an LSTM autoencoder. In one example, the network is an MPLS network. In one example, the times series corresponds to a period of time equal to or less than one year. In another case, the time period corresponds to a period of time equal to or less than two years.

At block 404, a decision tree model is trained. In an example, training the decision tree model is performed by decision tree model trainer 208. The decision tree model can be trained using the time series of historical mean error outputs accessed at block 402 as training data. The decision tree can be trained based on a supervised training method, where the historical mean error outputs are associated with particular times. The times and the historical mean error outputs may serve as the labeled training data for the training. As a result of the training, the trained decision tree model, such as trained decision tree model 220, is configured to receive a particular time and output a mean error that can be used as an adjustment, i.e., the mean error adjustment. In a specific example, the decision tree model is based on XGBoost.

At block 406, a mean error adjustment for a particular time is determined. Mean error adjustment determiner 212 can be used to determine the mean error adjustment. The mean error adjustment can be determined by inputting a particular time, for instance, a current time, into the trained decision tree model. In response, the trained decision tree model outputs a mean error that can be used for an adjustment, i.e., the mean error adjustment. In some cases, the output mean error adjustment is used to adjust a static threshold value. In another case, the mean error adjustment is used to adjust the mean error output by the trained neural network.

At block 408, an anomaly in the network traffic of the network for the particular time is identified. The identification can be performed using anomaly identifier 214. The anomaly can be identified based on the mean error adjustment determined at block 406. In one example, the anomaly is determined based on an adjusted mean error. The adjusted mean error can be determined by anomaly identifier 214. One method of determining the adjusted mean error is to adjust the mean error output by the trained neural network using the mean error adjustment. For instance, the mean error can be reduced by the mean error adjustment to determine the adjusted mean error.

In a specific case, to identify the anomaly, the adjusted mean error is compared to a static mean error threshold value. The comparison can determine whether the adjusted mean error exceeds the static mean error threshold value. If so, an anomaly is identified. In some cases, a plurality of mean error adjustments can be determined for a 24-hour time period. For instance, the mean error adjustment or the adjusted mean error can be determined for each hour. This can help account for daily seasonal variation trends in the network traffic metrics measured from the network.

Referencing now FIG. 5, the figure illustrates another example method 500 of anomaly detection. At block 502, a mean error adjustment is determined. The mean error adjustment can be determined using mean error adjustment determiner 212. The mean error adjustment can be determined for a particular time. To determine the mean error adjustment, the particular time can be input into a trained decision tree model. The trained decision tree model can be the result of training a decision tree model on a time series of historical mean error outputs. The historical mean error outputs can be determined using a trained neural network. The historical mean error outputs can have associated times, which can be used as supervised training data. Decision tree model trainer 208 is suitable for training the decision tree model. In an embodiment, the trained decision tree model is based on XGBoost. In some cases, a plurality of mean error adjustments can be determined during a 24-hour time period.

At block 504, a mean error is determined. The mean error can be determined using mean error determiner 210. The mean error can be determined from the trained neural network. To determine the mean error, network traffic metrics for a particular time are provided as an input to the trained neural network, which in response, outputs the mean error.

Neural network trainer 206 is suitable for training the neural network. The neural network can be trained on historical network traffic metrics and be configured to generate mean error outputs in response to network traffic metric inputs determined from network traffic across a network. In one embodiment, the network is an MPLS network. In an embodiment, the trained neural network is an LSTM autoencoder.

At block 506, the mean error is adjusted. The mean error can be adjusted using mean error adjustment determiner 212. The mean error can be adjusted using the mean error adjustment determined at block 502. For instance, the mean error can be reduced by the mean error adjustment to adjust the mean error.

In another embodiment, the mean error adjustment is used to adjust a static threshold. The static threshold can be reduced by the mean error adjustment. The static threshold can be determined experimentally based on the numbers of false positives to the number of true anomalies for a given static threshold value. In this embodiment, the result of the adjustment is an adjusted threshold value.

At block 508, an anomaly is identified. The anomaly can be identified using anomaly identifier 214. The anomaly can be identified for the particular time associated with the network traffic metrics. The anomaly is determined based on the adjusted mean error. For instance, the adjusted mean error can be compared to a static mean error threshold value. The anomaly can be identified where the adjusted mean error exceeds the static mean error threshold value.

In another embodiment, the mean error is compared to the adjusted threshold value. An anomaly is identified, where the mean error exceeds the adjusted threshold value.

Turning now to FIG. 6, the figure illustrates another example method 600 of anomaly detection. At block 602, a neural network is trained. Neural network trainer 206 can be used to train the neural network. The result of the training is a trained neural network, such as trained neural network 216. The training data can comprise historical network traffic metrics over a period of time, such as equal to or less than two years, or equal to or less than one year. As a result of the training, the trained neural network is configured to output a mean error in response to an input of network traffic metrics of a network, such as an MPLS network. A suitable neural network can be an LSTM autoencoder. In some cases, the trained neural network can be used to generate a time series of historical mean error outputs, such as historical mean error outputs 222.

At block 604, a mean error is determined. The mean error can be determined using mean error determiner 210. For instance, to determine the mean error, network traffic metrics for a particular time can be provided as an input to the trained neural network.

At block 606, the mean error is adjusted. The mean error can be adjusted using anomaly identifier 214. A mean error adjustment can be used to adjust the mean error. For instance, the mean error can be reduced by the mean error adjustment. The mean error adjustment can be determined using mean error adjustment determiner 212 employing a trained decision tree model, such as trained decision tree model 220. Based on its training, the trained decision tree model is configured to output the mean error adjustment in response to an input of a particular time. The decision tree model can be trained using training data comprising a time series of historical mean error outputs by the trained neural network. In a particular example, the trained decision tree model is based on XGBoost. The mean error adjustment can be determined for different times of a time period. For instance, a plurality of mean error adjustments can be determined for a 24-hour period.

At block 608, an anomaly is identified. The anomaly can be identified using anomaly identifier 214. For instance, the anomaly can be identified based on the mean error adjustment. In one method, the adjusted mean error is compared to a static mean error threshold, and an anomaly is identified where the mean error exceeds the static mean error threshold value. As noted, in other embodiments the mean error adjustment can be used to adjust a static threshold value to determine an adjusted threshold. The mean error is compared to the adjusted threshold value, and an anomaly is determined when the mean error exceeds the adjusted threshold value.

Figure 7:
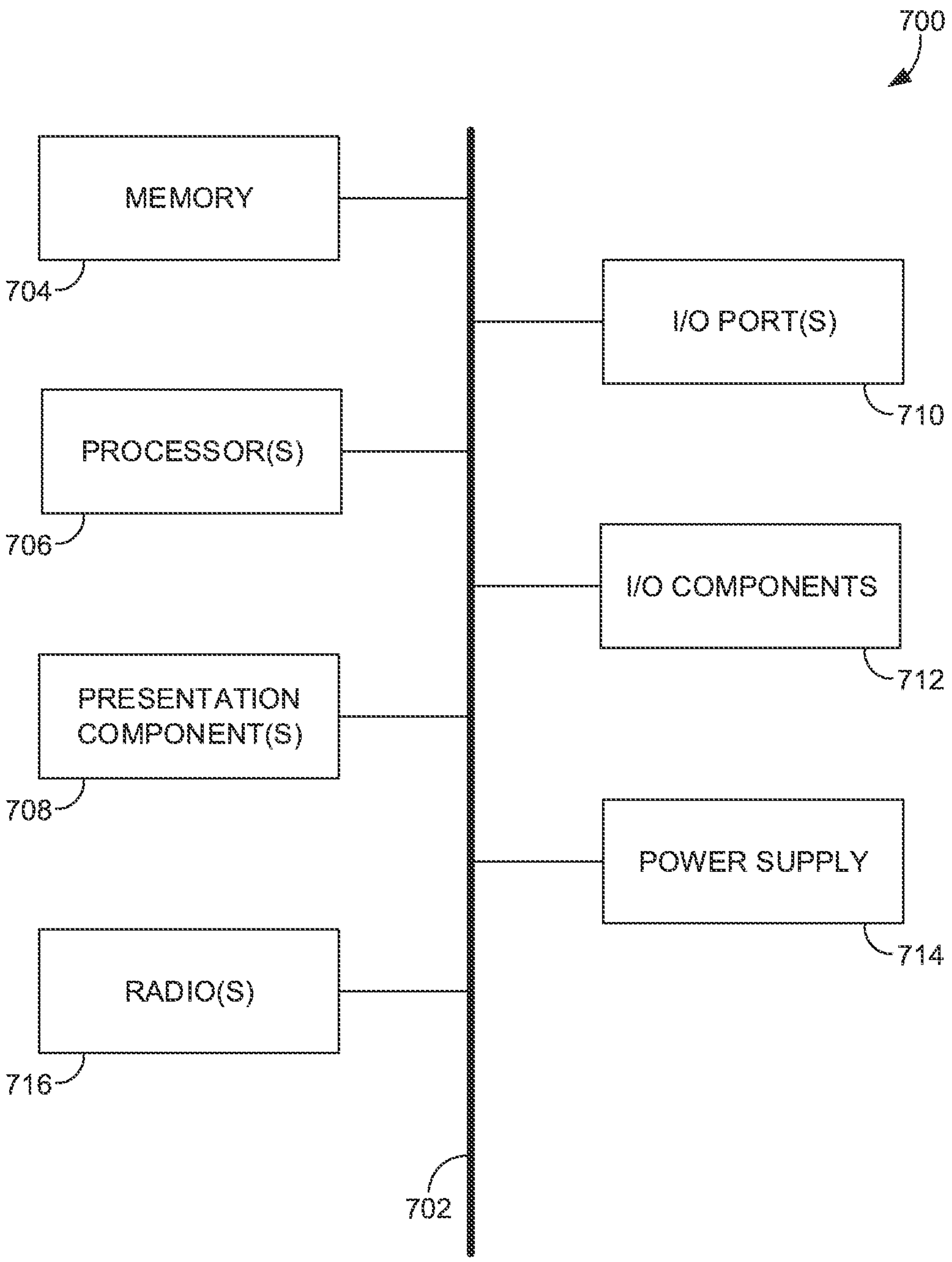
FIG. 7 is an example computing device suitable for implementing the described technology, in accordance with an embodiment described herein.

With reference to FIG. 7, computing device 700 includes a bus 702 that directly or indirectly couples the following devices: memory 704, one or more processors 706, one or more presentation components 708, input/output (I/O) ports 710, input/output (I/O) components 712, and an illustrative power supply 714. Bus 702 represents what may be one or more buses (such as an address bus, data bus, or combination thereof). Although the various blocks of FIG. 7 are shown with lines for the sake of clarity, in reality delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 7 is merely illustrative of an example computing device that can be used in connection with one or more embodiments of the present technology. Distinction is not made between such categories as "workstation," "server," "laptop," "handheld device," etc., as all are contemplated within the scope of FIG. 7 and may be referred to as "computing device."

Computing device 700 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and which can be accessed by computing device 700. In contrast to communication media, computer storage media is not a modulated data signal or any signal per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 704 includes computer-storage media in the form of volatile or nonvolatile memory. The memory may be removable, non-removable, or a combination thereof. Example hardware devices include solid-state memory, hard drives, optical-disc drives, etc. Computing device 700 includes one or more processors that read data from various entities, such as memory 704 or I/O components 712. Presentation component(s) 708 present data indications to a user or other device. Example presentation components include a display device, speaker, printing component, vibrating component, etc.

I/O ports 710 allow computing device 700 to be logically coupled to other devices, including I/O components 712, some of which may be built in. Illustrative components include a microphone, joystick, game pad, satellite dish, scanner, printer, wireless device, etc.

Radio 716 represents a radio that facilitates communication with a wireless telecommunications network. In aspects, the radio 716 utilizes one or more transmitters, receivers, and antennas to communicate with the wireless telecommunications network on a first downlink/uplink channel. Though only one radio is depicted in FIG. 7, it is expressly conceived that the computing device 700 may have more than one radio or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 716 might additionally or alternatively facilitate other types of wireless communications, including Wi-Fi, WiMAX, LTE, or other VoIP communications. As can be appreciated, in various embodiments, radio 716 can be configured to support multiple technologies, or multiple radios can be utilized to support multiple technologies. A wireless telecommunications network might include an array of devices, which are not shown, so as not to obscure more relevant aspects of the invention. Components such as a base station, a communications tower, or even access points (as well as other components) can provide wireless connectivity in some embodiments.

For purposes of this disclosure, the word "including," "having," or a variation thereof, has the same broad meaning as the word "comprising," and the word "accessing" comprises "receiving," "referencing," or "retrieving." Further, the word "communicating" has the same broad meaning as the word "receiving" or "transmitting" facilitated by software or hardware-based buses, receivers, or transmitters using communication media. Also, the word "initiating" has the same broad meaning as the word "executing or "instructing," where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

The subject matter of the present technology is described with specificity herein to meet statutory requirements. However, the description itself is not intended to limit the scope of this disclosure. Rather, the inventors have contemplated that the claimed or disclosed subject matter might also be embodied in other ways to include different steps or combinations of steps similar to the ones described in this document and in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

From the foregoing, it will be seen that this technology is one well adapted to attain all the ends and objects described above, including other advantages that are obvious or inherent to the structure. It will be understood that certain features and sub-combinations are of utility and may be employed without reference to other features and sub-combinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A computerized method for detecting network anomalies performed by one or more processors, the method comprising:

training a neural network using historical traffic metrics measured from network traffic across a network to generate a trained neural network;

utilizing the trained neural network to generate historical mean error outputs of a time series in response to historical network metric inputs;

accessing the time series of the historical mean error outputs generated by the trained neural network;

training a decision tree model on the accessed time series of historical mean error outputs, wherein the decision tree model is trained to output a mean error adjustment that accounts for seasonal variations in network traffic based on an input of a particular time;

utilizing the trained decision tree model to determine, for a particular time, a mean error adjustment that accounts for seasonal variation in the network traffic; and identifying an anomaly in the network traffic of the network for the particular time by determining that a mean error output by the trained neural network for the particular time exceeds the mean error adjustment output by the trained neural network for the particular time and exceeds the mean error adjustment output by the trained decision tree model for the particular time.

2. The method of claim 1, further comprising:

determining a mean error using the trained neural network, wherein the mean error is determined by the trained neural network in response to receiving a network traffic metric input; and adjusting the mean error using the mean error adjustment, wherein the anomaly is identified based on the adjusted mean error.

3. The method of claim 2, further comprising comparing the adjusted mean error to a static mean error threshold value, wherein the anomaly is identified based on the adjusted mean error exceeding the static mean error threshold value based on the comparison.

4. The method of claim 1, wherein the trained neural network is an LSTM (long short-term memory) autoencoder.

5. The method of claim 1, wherein the decision tree model is based on XGBoost (Extreme Gradient Boosting).

6. The method of claim 1, wherein a plurality of mean error adjustments is determined during a 24-hour time period.

7. The method of claim 1, wherein the network traffic comprises MPLS (Multiprotocol Label Switching) traffic and the network comprises an MPLS network.

8. A system for detecting network anomalies, the system comprising:

at least one processor;

one or more computer storage media having computer-usable instructions embodied thereon that when executed by the at least one processor, cause the at least one processor to:

train a neural network using historical traffic metrics measured from network traffic across a network to generate a trained neural network;

utilize the trained neural network to generate historical mean error outputs of a time series in response to historical network metric inputs;

train a decision tree model, wherein training the decision tree model comprises supervised training using a label data set including the time series of the historical mean outputs generated by the trained neural network, and a timestamp-derived feature for each of a plurality of timestamps;

utilize the trained decision tree model to determine, for a particular time, an expected baseline mean error value of the trained neural network corresponding to the particular time, and using the expected baseline mean error value as the mean error adjustment for the particular time;

adjust the mean error using the mean error adjustment; and identify an anomaly in the network traffic of the network for the particular time based on the adjusted mean error.

9. The system of claim 8, wherein the instructions further cause the at least one processor to compare the adjusted mean error to a static mean error threshold value, and wherein the anomaly is identified based on the adjusted mean error exceeding the static mean error threshold value based on the comparison.

10. The system of claim 8, wherein the trained neural network is an LSTM (long short-term memory) autoencoder.

11. The system of claim 8, wherein the decision tree model is based on XGBoost (Extreme Gradient Boosting).

12. The system of claim 8, wherein a plurality of mean error adjustments is determined during a 24-hour time period.

13. The system of claim 8, wherein the network traffic comprises MPLS (Multiprotocol Label Switching) traffic and the network comprises an MPLS network.

14. One or more computer storage media storing computer-readable instructions that when executed by a processor, cause the processor to perform operations of network anomaly detection, the operations comprising:

training a neural network with historical network metric inputs determined from network traffic across a network to generate a trained neural network;

utilizing the trained neural network to generate historical mean error outputs of a time series in response to the historical network metric inputs;

train a decision tree model, wherein training the decision tree model comprises supervised training using a label data set including the time series of the historical mean outputs generated by the trained neural network, and a timestamp-derived feature for each of a plurality of timestamps;

utilize the trained decision tree model to determine for a particular time, an expected baseline mean error value of the trained neural network corresponding to the particular time, and using the expected baseline mean error value as the mean error adjustment for the particular time;

adjusting the mean error using the mean error adjustment; and identifying an anomaly in the network traffic of the network for the particular time based on the mean error adjustment.

15. The media of claim 14, further comprising:

generating a time series of historical mean error outputs by providing historical network traffic metric inputs to the trained neural network; and training the decision tree model using the time series of historical mean error outputs, wherein based on the training, the decision tree model is configured to output mean error adjustments for particular times.

16. The media of claim 14, further comprising comparing the adjusted mean error to a static mean error threshold value, wherein the anomaly is identified based on the adjusted mean error exceeding the static mean error threshold value based on the comparison.

17. The media of claim 14, wherein the trained neural network is an LSTM (long short-term memory) autoencoder.

18. The media of claim 14, wherein the decision tree model is based on XGBoost (Extreme Gradient Boosting).

19. The media of claim 14, wherein a plurality of mean error adjustments is determined during a 24-hour time period.

20. The media of claim 14, wherein the network traffic comprises MPLS (Multiprotocol Label Switching) traffic and the network comprises an MPLS network.

* * * * *